Sept. 13, 1932.   F. M. POTTER   1,876,745
METHOD OF APPLYING HEAT TO THE COVERINGS OF ELECTRICALLY CONDUCTIVE CORES
Filed Aug. 26, 1927

Inventor
Frank M. Potter
By his Attorneys

Patented Sept. 13, 1932

1,876,745

UNITED STATES PATENT OFFICE

FRANK M. POTTER, OF ROME, NEW YORK, ASSIGNOR TO GENERAL CABLE CORPORATION, OF NEW YORK, N. Y., A CORPORATION OF NEW JERSEY

METHOD OF APPLYING HEAT TO THE COVERINGS OF ELECTRICALLY CONDUCTIVE CORES

Application filed August 26, 1927. Serial No. 215,627.

The present invention relates to improvements in methods of and apparatus for generating and applying heat to non-metallic substances disposed permanently or temporarily about a metallic core, the principal object of the invention being to so generate the heat that it may be applied progressively from the inner to the outer surface of the non-metallic substance which is to be acted upon in order to secure the maximum desirable effect of heat upon said substance.

The invention will be described in connection with a particular embodiment thereof and a few specific applications of the invention to problems arising in the industrial arts will be set forth, and it will be understood by those skilled in the art that the described embodiment and applications of the invention are selected merely for purposes of illustration, and further, that the invention is susceptible of embodiments and applications other than those specifically set forth.

In the heat treatment of the insulating coverings of electrical wires and cables, such coverings comprising rubber in some instances and fibrous dielectric material or varnishes in other instances, for the purpose of driving out moisture or, particularly in the case of rubber compounds, for the purpose of vulcanizing the same, it would be desirable to generate the applied heat internally instead of externally. I therefore propose, in accordance with the present invention, to bring the covered or coated conductor into or pass the same through a magnetic field in order that electrical currents may be induced in the conductor and therein generate sufficient heat to accomplish the desired result upon the covering of the conductor.

The same or a similar procedure may be followed in the case of substances temporarily applied to a metallic core and so shaped and disposed with relation to the core that other methods of heating the core cannot be practicably employed.

Figure 1:
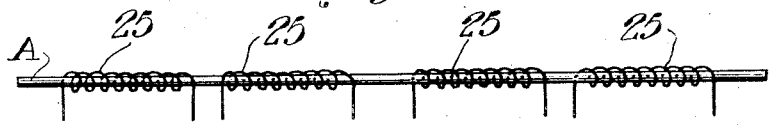
Figure 2:
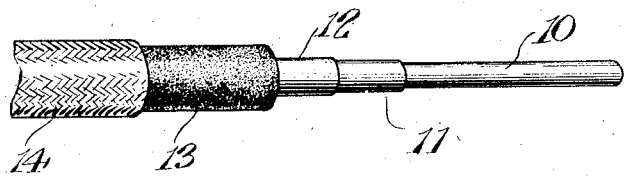
Figure 3:
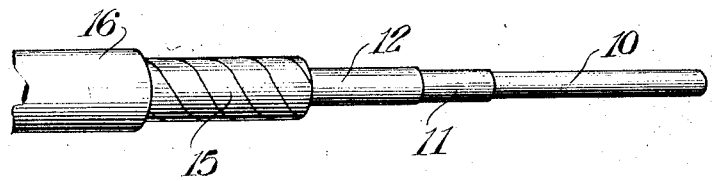
Figure 4:
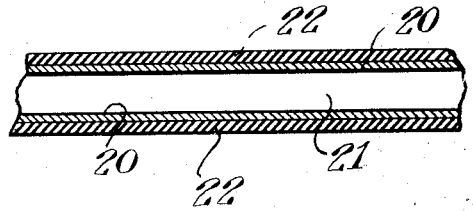

The accompanying drawing shows by way of example the manner in which the present invention may be applied; the apparatus being shown diagrammatically in Figure 1; and typical assemblies which may be heat treated in accordance with the invention being shown in Figures 2 to 4 inclusive.

Referring first to Figure 2 of the drawing, an insulated electrical cable A is shown progressively cut away to reveal its internal construction. This cable comprises a metallic conductor 10 which may be of copper or other suitable metal possessing properties of high electrical conductivity and low resistance. Preferably this conductor if of high conductivity is provided with a coating 11 of tin or a coating 12 of zinc, or both, for purposes which will be later explained. The conductor, including the coating if applied, is covered with a tube of insulating compound 13 made up largely of rubber. This compound may be applied by any of several known methods more or less generally used. The insulating material 13 may be covered or protected by further wrappings or coatings and a surface braid 14.

Figure 3 of the drawing illustrates another type of insulation commonly applied to electrical conductors and comprising successive wrappings 15 of fibrous material such as paper tape, surrounded and protected by a moisture-proof sheath 16 which may be of lead as in ordinary lead covered cable, or of any other suitable moisture-resistant material.

In the structures shown in Figures 2 and 3 the cores or metallic conductors 10 are permanently enclosed within the surrounding material. Figure 4 shows a structure to which the invention may be applied and in which a temporary core is employed. In the case of a temporary core it is preferable, for reasons which will later appear, to use a metal of relatively high resistance to an electrical current and the core itself, if it is of appreciable diameter, may be hollow. In Figure 4 a tubular core 20 is shown and this core has a central bore 21. A layer 22 of rubber or other material to be treated is applied in any suitable manner upon the core and may be subjected to heat treatment in accordance with the present invention as hereinafter explained.

Reverting to the structure shown in Figure 2, it may happen under certain conditions that the covering 13 of rubber or rubber compound may contain a certain amount of solvent or moisture which it is desired to remove. The removal thereof can best be effected by the application of heat, first to the inner surface of the coating, that is, where it contacts with the metallic conductor, and from there progressively outward so that the moisture is driven out to the surface of the covering 13 and there dissipated. Again in connection with the structure shown in Figure 3 it may be desired to thoroughly dry out the wrapping 15 of paper or other fibrous material prior to the application of the lead sheath 16 or its equivalent and this too may be most effectively accomplished in similar manner. Furthermore in the case of the covering 13 of the conductor shown in Figure 2, or in the case of the covering 22 upon the core 20 in Figure 4, it may be desired to continue the application of heat a sufficient time and in a sufficient amount to accomplish what is known as the vulcanization of the rubber or rubber compound, and this too may be effected by the generation of heat in the core and its application therefrom outward through the rubber. In the case of thick walls of rubber or rubber compound it may be desirable to supplement the application of heat to the outer surface of the wall by the application of heat to the inner surface as herein described in order to insure uniform vulcanization throughout the wall.

Now referring to Figure 1 of the drawing, a diagrammatic representation of apparatus for carrying out the invention will be described. The apparatus shown in Figure 1 represents diagrammatically an arrangement by which an electrical current may be induced in a metallic core such as the conductors 10 of Figures 2 and 3 (or the core 20 of Figure 4) in order to generate heat therein. This result is accomplished by creating a magnetic field in close proximity to the conductors through the agency of a primary coil or coils 25 in which an alternating current of high frequency is caused to flow. The alternating magnetic field thus set up will induce currents in the conductor placed therein, for example in the conductor 10 held or passed at proper speed through the interior of the primary coil or coils. Inasmuch as the invention is adapted for use in connection with electrical conductors of ordinary size, as for instance a No. 14 B. & S. gauge wire, and inasmuch as the induced eddy currents or currents in the nature of eddy currents set up in this wire tend to flow in a path roughly parallel to the path of current flow in the primary coil, the path of the induced current will be very short, the maximum being the circumference of the conductor to be heated. Consequently the primary circuit which is arranged in close proximity to the conductor to be heated, is of as small diameter as possible and a very high frequency alternating current in the order of 10,000 cycles per second and upward is used. Known apparatus is available for the production of a frequency of one million cycles per second by the employment, for example, of a vacuum tube oscillator.

The amount of induced current which may be set up in the conductor to be heated depends partly upon the resistance of the material in which the induced current is established. The core of the structure shown in Figures 2 and 3 is mainly of copper or some other low resistance metal in order that the same may be an efficient electrical conductor when in use. This renders it difficult to induce a sufficient current to heat the conductor while practicing the present invention thereon and accordingly the conductor is coated with tin or zinc or both, as previously described, in order to provide a path for the induced currents which will be more resistant thereto than the copper or like metal and therefore contribute substantially to the generation of heat. The circumferential path of the induced current is largely upon the surface of the conductor to be heated and although the coatings of tin and zinc provide a path of greater resistance, the current will nevertheless flow in that path because of its proximity to the windings of the primary coil. Although the heating of the copper wire may be possible without the coatings of tin or zinc or both, the generation of heat is greatly assisted and to a large extent rendered practicable by the coating of some highly resistant metal on the surface of the copper conductor.

The core of the structure shown in Figure 4 being a temporary one employed merely for the purpose of supplying internal heating to its covering, and since it need not serve as an electrical conductor, may be made of a material which is relatively a poor conductor and which has a high resistance. It therefore may be heated directly without the application upon its surface of high resistance metallic coatings and by currents of lower frequency than are employed with the structure shown in Figures 2 and 3.

It is to be understood that this invention may have further embodiments and is subject to various changes within the scope of the appended claims.

What I claim is:

1. The method of manufacturing electrical cables of indefinite length which comprises, covering a copper conductor with a complete thin surface coating of tin, covering the tin coating with a complete thin surface coating of zinc, covering the coating of zinc with a relatively thick complete surface coating of rubber, and vulcanizing the rubber by passing the completed cable continuously through a closely overlying coil of definite length carrying high frequency electrical currents, whereby the conductor is inductively heated by the current passing through said coil and produces heating of the rubber coating from its interior surface outward.

2. The method of manufacturing electrical cables of indefinite length which comprises, covering a copper conductor with a complete surface coating of tin, covering the tin coating with a complete surface coating of zinc, covering the coating of zinc with a complete surface coating of rubber, and vulcanizing the rubber by passing the completed cable continuously through a closely overlying coil of definite length carrying high frequency electrical currents whereby the conductor is inductively heated by the current passing through said coil and produces heating of the rubber coating from its interior surface outward.

3. The method of manufacturing electrical cables of indefinite length which comprises, covering a copper conductor with a complete surface coating of tin, covering the tin with a complete surface coating of rubber, and vulcanizing the rubber by passing the completed cable continuously through a closely overlying coil of definite length carrying high frequency electrical currents whereby the conductor is inductively heated by the current passing through said coil and produces heating of the rubber coating from its interior surface outward.

4. The method of manufacturing electrical cables of indefinite length which comprises covering a conductor of relatively low resistance with a complete thin surface coating of conducting material of relatively higher resistance, covering the first mentioned coating with a relatively thick surface coating of rubber and vulcanizing the rubber by passing the completed cable continuously through a closely overlying coil of definite length carrying high frequency electrical currents whereby the conductor is inductively heated by the current passing through said coil and produces heating of the rubber coating from its interior surface outward.

5. The method of manufacturing electrical cables of indefinite length and having an electrical conductor of low resistance, which comprises, applying to the conductor an element providing a conducting path of relatively high resistance, enclosing the conductor with a covering of nonconducting material and heating the covering by passing the completed cable through a closely overlying coil of definite length carrying high frequency electrical currents whereby the conductor is inductively heated by the current passing through said coil and produces heating of the covering from its interior surface outward.

6. The method of manufacturing electrical cables of indefinite length and having an electrical conductor of low resistance, which comprises applying to the conductor an element providing a conducting path of relatively high resistance, enclosing the conductor with a complete covering of insulating material and heating the insulating material by passing successive lengths of the completed cable through a closely overlying coil of definite length carrying high frequency electrical currents, whereby the conductor is inductively heated by the currents passing through said coil and produces heating of the covering from its interior surface outward.

7. The method of heating an electrically non-conductive material upon a core of highly conductive material which comprises covering the outer surface of the core with a relative poorer conductive material prior to application of the non-conductive material and heating the core by induced effects of electrical currents of high frequency.

8. The method of manufacturing electrical cables of indefinite length which comprises, covering a copper conductor with a complete thin surface coating of tin, covering the tin coating with a complete thin surface coating of zinc, covering the coating of zinc with a complete relatively thick surface coating of non-conductive material and heating the same by passing the cable continuously through a closely overlying coil of definite length carrying high frequency electrical currents, whereby the conductor is inductively heated by the current passing through said coil and produces heating of the covering from its interior surface outward.

9. The method of manufacturing electrical cables of indefinite length which comprises, covering a copper conductor with a complete surface coating of tin, covering the tin coating with a complete surface coating of zinc, covering the coating of zinc with a complete surface coating of a non-conductive material and heating the same by passing the cable by a coil of definite length carrying high frequency electrical currents, whereby the conductor is inductively heated by the current passing through said coil and produces heating of the covering from its interior surface outward.

10. The method of manufacturing electrical cables of indefinite length which comprises covering a conductor of relatively low resistance with a surface coating of conducting material of relatively higher resistance, covering the first mentioned coating with a coating of non-conductive material, and heating the same by carrying the cable past a closely adjacent coil of definite length carrying high frequency electrical currents whereby the conductor is inductively heated by the current passing through said coil and produces heating of the insulating covering from its interior surface outward.

11. The method of heating a substantially electrically non-conductive element upon a core comprising an inner element of relatively highly conductive material and an outer element of relatively poorer conductive material which comprises heating the core by induced effects of electrical currents, whereby the non-conductive element is heated from its interior surface outwardly.

12. The method of heating a substantially electrically non-conductive element upon a core of relatively highly conductive material which comprises applying to the outer surface of the core a coating of conducting material of relatively high resistance including circumferentially complete elements prior to the application of the non-conductive element, and heating the core by induced effects of electrical currents.

13. The method of heating the insulating covering of an electrically conducting core having an outer coating of conducting material immediately overlying conducting material of relatively lower resistance, which method comprises passing the insulated conductor through a high frequency alternating current magnetic field to generate heat in the conductor which passes radially outwardly from the interior surface of the insulating covering.

In testimony whereof, I have signed my name to this specification this 20th day of August, 1927.

FRANK M. POTTER.